2 Sheets—Sheet 1.

J. H. CHRISTOPHER.
Gate.

No. 215,574. Patented May 20, 1879.

Witnesses:
J. W. Garner
W. S. D. Haines

Inventor:
Jas. H. Christopher
per
F. A. Lehmann,
atty.

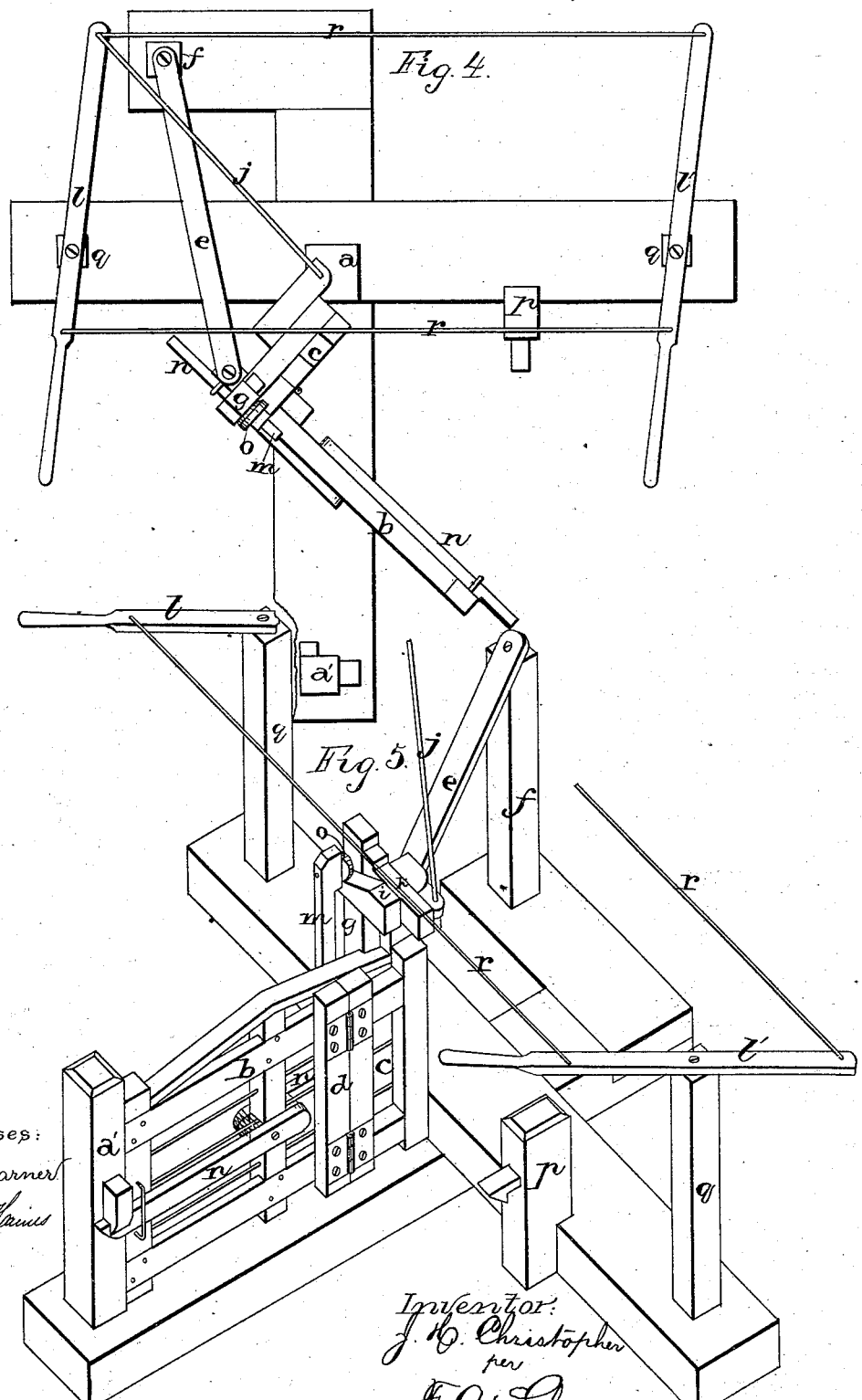

UNITED STATES PATENT OFFICE.

JAMES H. CHRISTOPHER, OF CHESTERFIELD, ILLINOIS.

IMPROVEMENT IN GATES.

Specification forming part of Letters Patent No. 215,574, dated May 20, 1879; application filed April 11, 1879.

*To all whom it may concern:*

Be it known that I, JAMES H. CHRISTOPHER, of Chesterfield, in the county of Macoupin and State of Illinois, have invented certain new and useful Improvements in Gates; and I do hereby declare the following to be a full, clear, and exact description of the invention, such as will enable others skilled in the art to which it pertains to make and use it, reference being had to the accompanying drawings, which form part of this specification.

My invention relates to an improvement in gates; and it consists in the arrangement and combination of parts, whereby the gate may be opened and closed by parties in vehicles or on horseback without having to dismount, as will be more fully described hereinafter.

Figure 1:
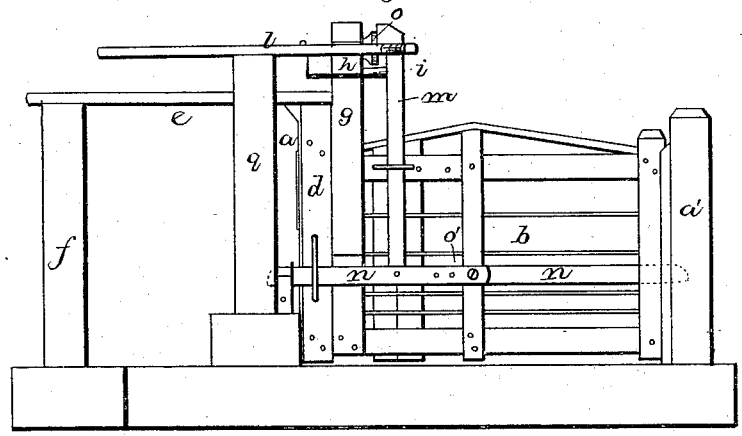
Figure 2:
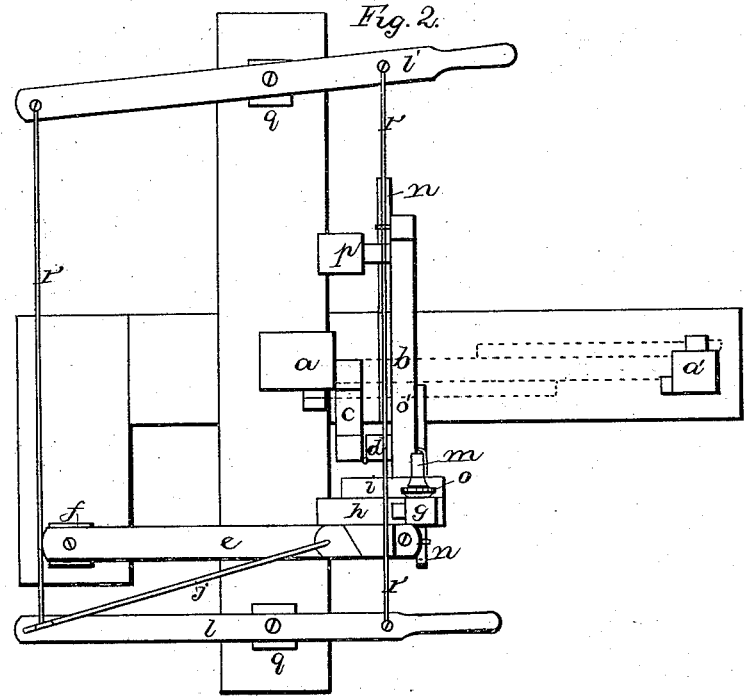
Figure 3:
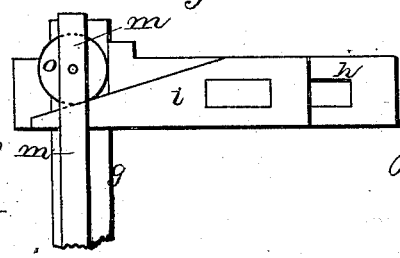

Figure 1 is a side elevation of my invention. Figs. 2 and 4 are plan views of the same, and Fig. 3 is a detail view, and Fig. 5 is a perspective.

$a$ represents the post to which the gate is attached, and $a'$ the post against which it closes. The gate $b$, of any suitable construction, is not hinged directly to the post $a$; but these two parts are connected together by the frame $c$, which is hinged to the post $a$ at one edge, and to a vertical bar, $d$, rigidly secured to the gate at the other. By means of this intermediate frame, $c$, when the gate is opened the inner end of the gate does not remain in contact with the post, but moves sidewise far enough to bring the center of the gate just opposite the post $a$, as shown.

In order to always insure this sidewise movement of the gate, the inner end of the gate is fastened to a post, $f$, placed in the rear and to one side of the post $a$, by means of a rod, $e$, which prevents the gate from having any other than its prescribed movement, as above described.

Secured to and rising above the inner end of the gate is the upright $g$, to the upper end of which is secured the slotted guide $h$, upon which the slide $i$ moves. This slide is moved by a rod, $j$, fastened to the operating-lever $l$, and has one end beveled, so as to move under the roller $o$, attached to the upper end of the rod $m$, and raise the rod a sufficient distance to operate the latch $n$, to which the lower end is pivoted.

This latch, instead of being made short, as is usual, is made of two pieces, one of which is placed on each side of the gate, and which have their inner ends united through the gate by an interposed block, $o'$. The two parts of the latch are pivoted upon the same bolt that passes through the gate, and have their outer ends project a suitable distance beyond each end of the gate, so that when the gate is closed one end of the latch catches under a stop on the post $a'$, while the other end catches over a second one on the post $a$, thus latching the gate at both ends at the same time.

When the gate is open, one end of the latch catches under the stop on the post $p$, so as to keep it open. As the latch forms one piece, and is pivoted at its center, its ends move in opposite directions, so that they latch and unlatch at the same time.

The two operating-levers $l\ l'$, pivoted upon posts $q$, are fastened together by means of the two wires $r$, so as to cause them to move together; but they are not in any manner attached to the gate, and do not exert any influence upon it, except through the rod $j$.

Owing to the interposition of the frame $c$, the slotted guide $h$ also serves as a lever by which the gate is moved as the levers $l\ l'$ are operated by persons in vehicles or on horseback. As the frame $c$ shortens the movement of the gate fully one-half, the posts $q$ are placed close to the gate; and as the gate does not fly open by its own weight, not only can the parts of the gate be placed more closely together, but the gate is not injured, and does not get out of repair as soon as those that fly open.

Having thus described my invention, I claim—

1. The combination of the gate $b$, post $a$, frame $c$, upright $g$, slotted arm $h$, rod $j$, and operating-levers $l\ l'$, substantially as described.

2. The combination of the levers $l\ l'$, connected together, rod $j$, slide $i$, guide $h$, supported on post $g$, rod $m$, and latch $n$, substantially as specified.

In testimony that I claim the foregoing I have hereunto set my hand this 24th day of March, 1879.

JAMES HARVEY CHRISTOPHER.

Witnesses:
J. S. REED,
WARREN CHRISTOPHER.